Figure 1:
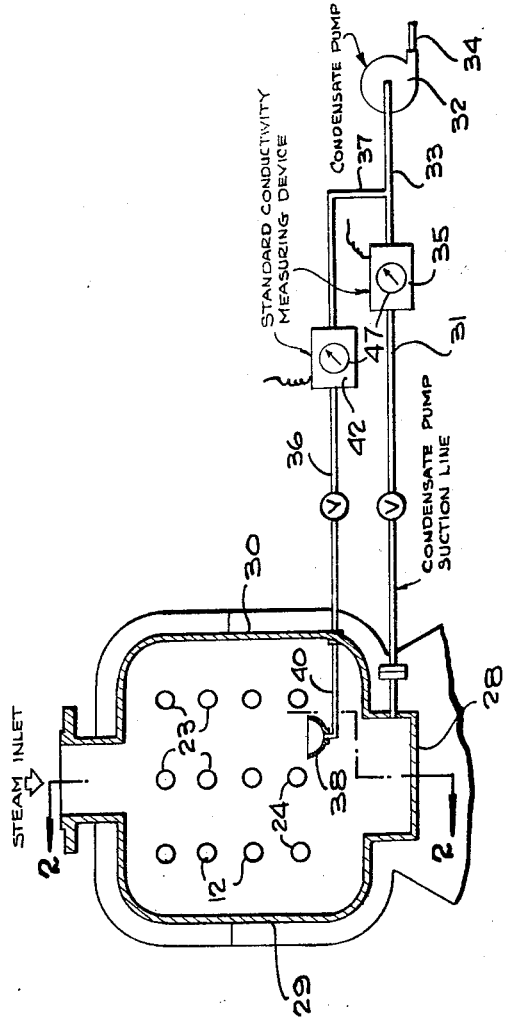

Aug. 16, 1966

J. W. MADDOX 3,267,361

APPARATUS FOR DETERMINING SALINITY OF
CONDENSED STEAM IN A CONDENSER

Filed Jan. 8, 1962

INVENTOR
JAMES W. MADDOX

BY *Shoemaker and Mattare*

ATTORNEYS

United States Patent Office 3,267,361
Patented August 16, 1966

3,267,361
APPARATUS FOR DETERMINING SALINITY OF CONDENSED STEAM IN A CONDENSER
James W. Maddox, Newport News, Va., assignor to Newport News Shipbuilding and Dry Dock Company, Newport News, Va., a corporation of Virginia
Filed Jan. 8, 1962, Ser. No. 164,939
2 Claims. (Cl. 324—30)

The present invention relates to a method and apparatus for determining the purity of feed water for a steam generating cycle, and more particularly for determining the chloride ion concentration in the feed water.

In a steam generating or steam vapor system, and particularly in marine power plants, it is necessary to maintain the boiler water or the feed water in the system substantially pure in order to prevent damage to the apparatus in the system and particularly to the boiler tubes.

As the salinity of the water increases above a predetermined value, the boiler tubes will sometimes become coated with a scale so that the coefficient of heat transfer will be reduced, thereby impairing the efficiency of the system. Another difficulty caused with the formation of scale is that the boiler tubes will sometimes develop hot spots and burn out or burn through where the coating is deposited on the inner surface thereof, thus necessitating expensive repair and close down of the system.

At the present time as more and more marine power plants employ nuclear reactors as a primary heat source, the problem of detecting minute concentrations of the chloride ion in the feed water circulated in the system becomes more acute. This is because most steam generating systems and steam generators and heat exchanger tubes associated with nuclear reactors are fabricated from stainless steels. It has been found in the presence of the chloride ion, the stainless steels are subjected to a phenomenon known as Halide Stress Corrosion Cracking.

At the present time little is known about this process except that small cracks will develop in the metal and thus lead to its ultimate failure necessitating removal of the damaged tubes and parts and, of course, great expense in time and effort in repairing the damaged parts and putting the system back into operation.

The only remedy now available to alleviate this difficulty is to maintain the concentration of the chloride in the steam generator below 0.5 p.p.m. (parts per million) by (1) preventing chloride from entering the steam generator and (2) blowing down impure water and refilling with pure water. Chloride enters the steam generators in the feed water which is condensate from turbine exhaust steam. In the condensing process, salt water passes through tubes to remove the latent heat of vaporization. For various reasons tubes develop leaks and the condensate becomes contaminated. All contaminants precipitate out in the steam generator such that a small amount of chloride in the feed water would eventually build up the concentration in the steam generator above the allowable level of 0.5 p.p.m. Chloride concentration in the steam generator is determined by periodic chemical analysis. However, detection of chlorides in the condensate is desirable in order to permit corrective action before damage is done. Chloride detention of 0.1 p.p.m. by increasing the conductivity is desired but is very difficult to obtain due to the impurities already present in the condensate from the moisture carried over with the steam from the steam generator and other impurities such as corrosion products picked up from piping, and also the variation of conductivity with temperature.

At present, a known method which has been employed to monitor the conductivity of the feed water in a vapor generator system is to extract a reference sample of the vapor being generated from the main steam line which is located just downstream of the outlet pipe of the steam generator. With the concentration of the chloride in the main steam line used as a reference level, the conductivity of the water in the system at other check points is compared therewith. Such other check point may be at the condensate pump discharge or the main feed booster pump suction.

When the conductivity level of the water taken at the check point rises above this reference level taken at the discharge of the boiler by some predetermined value, an alarm is sounded so that the system may be shut down or other stand by or interchangeable apparatus and equipment utilized to obtain pure feed water for the system not having such a high concentration of chloride ion.

One disadvantage in such a method is that it is difficult to extract a representative sample of fluid from a pipe conveying saturated steam. Another disadvantage is that there is a considerable delay between the time a volume of steam is monitored in the reference point and the time that its equivalent water volume is monitored after leaving the condenser hot well. There is also a large temperature differential between the two points at which the conductivity is measured and compared which is undesirable as the conductivity varies with temperature. There is also the possibility of a large differential reading in the conductivity between the two measuring points due to either corrosion products entering the sample en route through the system or a loss of carry-over moisture due to separators.

It is an object of the present invention to eliminate the above-mentioned difficulties and to provide an apparatus and method to monitor the conductivity of the water to be used for boiler feed by determining the chloride ion concentration in a sample of the condensate in the condenser and using this point of measurement as a reference level, comparing the chloride ion concentration with the condensate collected in the condenser hot well. This permits the hot well effluent conductivity of the feed water to be compared with the conductivity of the condensate before it has been subjected to contaminants within the condenser.

In accordance with the present invention sampling means are placed in the condenser directly beneath the condenser tubes to catch a sample of the condensate. The cross-sectional area of the open end of the sampling cup means is preferably one-thousandth of the total area of the condesner. The conductivity of the condensate is measured by a standard conductivity measuring device, and the condensate sample that is bled off from the condenser is returned to the condensate line.

The condensate line between the hot well of the condenser and the condensate pump is also provided with a similar conventional conductivity measuring device therein so that the conductivity of the hot well effluent registered or determined in this line may be readily and quickly compared with the conductivity reading at the reference point. This apparatus and method thus means that any change in conductivity due to temperature variation will be automatically compensated for since both the condensate sample effluent and the main condensate stream will be at approximately the same temperature.

It is also apparent that the comparison of the conductivity of the condensate sample effluent with the main condensate stream at the condensate pump suction will eliminate the possibility of a large differential reading due to either corrosion products entering the sample en route through the system or a loss of carry-over moisture due to separators.

It is also apparent that since sea water is used as the coolant in the steam generating cycle in the condensing process, and the major source of chloride condensation in the feed water of a marine installation is in the main condenser, the comparison of the sample effluent at the condenser and the conductivity of the main condensate stream here will immediately indicate any leakage of sea water into the closed boiler cycle.

Figure 2:
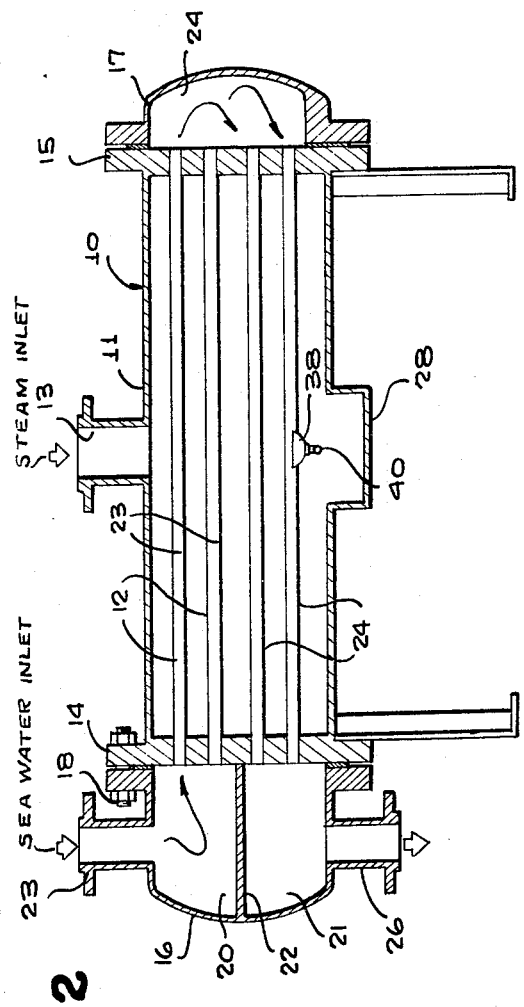

Various other objects and advantages of the present invention will be readily apparent from the following detailed description when considered in connection with the accompanying drawing forming a part thereof, and in which:

FIG. 1 is a more or less diagrammatic end view of the apparatus for detecting the chloride ion concentration in a boiler cycle; and FIG. 2 is a more or less diagrammatic side view of the condenser illustrating the point of taking a sample effluent in the condenser.

Referring to the drawing, the reference numeral 10 generally designates a condenser having a shell containing a plurality of tubes 12 therein forming a tube bundle through which sea water flows to cool the exhaust steam being discharged from the main turbine of the cycle, or other power plant means. The exhaust steam enters through the steam inlet pipe 13 disposed in the top of the shell 11 between the opposite end plates or tube sheets 14 and 15 thereof, and flows around the outside of the tubes 12 therein.

The tube sheets 14 and 15 have header members or boxes 16 and 17 detachably connected thereto by bolt members 18 in a fluid-tight manner. The header 16 is provided with an upper inlet chamber 20 and a lower outlet chamber 21 formed therein by a division member or horizontal partition 22. The inlet chamber 20 has an inlet pipe 23 in the top thereof through which sea or salt water flows. The salt water passes through the upper portion 23 of the tube bundle flowing through tubes 12 and is discharged from the opposite end of these tubes into the chamber 24 formed by header 17. Thereafter, this cooling water flows through the lower portion 24 of the tube bundle through the tubes 12 and is discharged into chamber 21.

The water thereafter flows through outlet pipe 26 connected to the bottom of chamber 21 from whence it is discharged back into the sea. Thus, the condenser is a two-pass or double pass condenser in which the sea water passing through the interior of the tubes flows in indirect heat exchange relationship with the exhaust steam passing into the condenser shell 11 through pipe 13 around the tubes so that the exhaust steam is cooled and condensed. The condensate drops or falls by gravity down into the hot well 28 in the bottom of the condenser, formed intermediate of the opposite ends of the shell 11 and also disposed symmetrically with respect to the opposite side walls 29 and 30 of the shell. The condensate is discharged from the hot well 28 through a condensate line or pipe 31 connected to and in communication with the lower portion of the hot well 28. A centrifugal condensate pump 32 having a suction side or inlet 33 and a discharge side or outlet 34 returns the condensate to the standard condensate booster pump and feed water pump, not shown, for recycling it through the closed boiler system.

A standard conductivity measuring device generally designated 35 is disposed in condensate line 31 between the hot well 28 and the suction 33 to the condensate pump 32. This conductivity measuring device does not per se form the invention but is well known and is commercially available. It has an appropriate electrical network and measures the chloride ion concentration in the condensate flowing through pipe 31 and registers the concentration of the chloride in parts per million, the operator merely reading it from the standard dial face 47.

Another pipe 36 has one end connected to and in communication with the interior of the condenser and has its opposite end indicated at 37 connected to the condensate pipe 31 between the conductivity measuring device 35 and the suction 33 to the condensate pump 32.

A cup member 38 having an open upper end is connected by a small pipe 40 in the condenser to the condensate sample effluent line 36 as best seen in FIG. 1. The cross-sectional area of the open end of the tube 38 is approximately $\frac{1}{1000}$ of the total area of the condenser. The cup 38 is located between tubes 12 adjacent the lower portion of the tube bundle of the condenser as shown in FIG. 1. It is also disposd longitudinally of the condenser at a point approximately midway between the tube sheets 14 and 15, and above the hot well so that it is located away from regions in the condenser where salt water leakage most frequently occurs. The salt water leakage in a condenser will generally occur adjacent the tube sheets 14 and 15 in which the ends of the tubes are secured. The tube ends are generally secured in the tube sheets by belling or flaring the ends of the tubes in abutting contact with the tube sheets to form a liquid-tight seal therebetween. Since the sea water entering the condenser through inlet pipe 23 is under atmospheric pressure and the condenser is under a vacuum or subatmospheric pressure, there is a large pressure differential across the condenser and hence a small leakage path in one of the tubes wherein it is flared into the tube sheet is all that is needed to induce salt water from the salt water side to the steam side of the condenser. This is the main point or area of contamination of the relatively pure feed water being circulated in the boiler system with the undesirable or unwanted chloride ion concentration.

Hence from the foregoing description it is obvious that the sample effluent cup 38 is disposed in the condenser at a location so that the effluent collected in the sampling cup is free from contaminants entering the condenser from the sea water and will only collect condensate therein which truly and accurately represents the chloride ion concentration in the water that is being circulated through the system or cycle. A standard conductivity measuring device 42 is disposed in line 36 before the end 37 thereof connected to condensate line 31. It is this standard conductivity measuring device that registers or measures the true or accurate chloride ion concentration in the water being continuously circulated in the boiler cycle and converted from water to steam and back to water in successive cycles.

The registration of the chloride ion concentration in the measuring device 42 is used as a reference sample and is compared with the measurement or registration of the chloride ion concentration reading of the measuring device 35 in the main condensate stream. When the conductivity level of the condensate in line 31 rises above the reference level by some predetermined value, an alarm is sounded, by means not shown, such as a bell, a light or the like so that the proper steps may be taken to correct the undesirable heavy chloride ion concentration in the system.

Thus, it is apparent that the present invention provides a novel apparatus and method for sampling the feed water being circulated in a steam generating cycle to detect accurately and quickly a rise in the chloride ion concentration above a predetermined value and at the source or point wherein the probability of contaminating the condensate with chloride ion is high.

It is also apparent that the present invention provides a method and apparatus for monitoring the conductivity of the feed water in a boiler cycle by comparing a reference sample with the main condensate stream in which variations of conductivity due to temperature variation are automatically compensated for since both the sample effluent and the main condensate stream are at approximately the same temperature. The method of the present invention further eliminates any appreciable time lag between the monitoring points and eliminates the possibility of a large differential reading due to either corrosion products entering the sample through the system or due to a loss of carry-over moisture due to separators.

Inasmuch as changes may be made in the form, location and relative arrangement of the several parts of the invention and in the sequence of the various method steps without departing from the principles of the invention, it will be understood that the invention is not to be limited excepting by the scope of the appended claims.

I claim:

1. Apparatus for monitoring the salinity concentration of the liquid cycled through a steam generating system, comprising a condenser housing containing spaced tube end sheets and tubes having thin ends disposed in and extending between said tube sheets, a hot well in the bottom of the condenser, a condensate discharge conduit connected to the hot well, an upwardly opening cup within said housing above the bottom thereof and below at least one of said tubes, and out of vertical alignment of any of said tubes, an effluent conduit extending into said housing and connected to the bottom of said cup, and a salinity measuring device disposed in each of said conduits whereby the salinity concentration in said discharge conduit may be compared with the concentration in said effluent conduit.

2. Apparatus for condensing steam and determining the chloride ion concentrate in the condensed steam comprising a horizontally extending hollow condenser housing, spaced end plates connected in sealing relationship to the opposite ends of said housing whereby said housing and end plates define a sealed condenser chamber, each of said end plates having a plurality of ports therethrough, a plurality of condenser tube means extending between said plates and located within said chamber, the ends of said tube means connected to said plates so as to be in communication with said ports, means adjacent one of said end plates for supplying condensing fluid to said ports and tubes, steam inlet means communicating with said chamber, a hot well in the bottom of said chamber adapted to collect liquid condensing on said tubes, a receptacle having an open top mounted in said chamber between at least one of said tube means and said hot well and spaced from said end plates, first and second salinity conductivity measuring means outside said chamber, first and second conduit means connecting said first and second salinity conductivity measuring means to said receptacle and hot well respectively whereby the salinity of the fluid in said receptacle and hot well may be visually observed and compared, said hot well comprising a depression in the bottom of said housing, the cross sectional area of the top of said receptacle being substantially $1/1000$ of the total area of said condenser, and said first and second salinity conductivity measuring means each including means for visually indicating the salinity of the fluid passing therethrough, said first and second salinity measuring means each having outlet ports and a suction pump connected to said outlet ports, said means for supplying condensing fluid comprising a hollow cover secured to said one end plate, a horizontal partition dividing said cover into upper and lower compartments, said upper and lower compartments being in communication with upper and lower ports respectively in said one end plate, said upper and lower compartments having inlet and outlet ports respectively, a second hollow cover secured in sealing relationship to the other end plate so that all the ports in said other end plate are in communication with the interior of said second hollow cover.

References Cited by the Examiner

UNITED STATES PATENTS

| 2,565,501 | 8/1951 | Ingram | 324—30 |
| 2,739,663 | 3/1956 | Gurney | 324—30 X |
| 2,792,343 | 5/1957 | Vogler | 165—11 X |

OTHER REFERENCES

Parker et al.: "Conductivity Methods of Measuring Condenser Leakage"; Sept. 27, 1927; pp. 476–481, Power.

WALTER L. CARLSON, *Primary Examiner.*

FREDERICK M. STRADER, *Examiner.*

C. F. ROBERTS, *Assistant Examiner.*